TRANSISTOR BIASING CIRCUIT

Filed May 7, 1956 2 Sheets-Sheet 1

INVENTOR.
Harry Thanos
BY
Donald W. Phillion
HIS ATTORNEY

TRANSISTOR BIASING CIRCUIT

Filed May 7, 1956

INVENTOR.
Harry Thanos
BY
Donald W. Phillion
HIS ATTORNEY

United States Patent Office 2,926,308

Patented Feb. 23, 1960

2,926,308

TRANSISTOR BIASING CIRCUIT

Harry Thanos, Gary, Ind., assignor to Admiral Corporation, Chicago, Ill., a corporation of Delaware Application May 7, 1956, Serial No. 583,021

3 Claims. (Cl. 330—40)

This invention relates generally to gain control circuits, and more specifically to an amplifier employing a transistor in which the gain varies inversely as the magnitude of the D.-C. power supply voltage.

Generally speaking, the magnitude of the output of of electronic equipment employing amplifying stages will increase or decrease as the magnitude of the D.-C. power supply voltage increases or decreases. However, with the more usual types of power supplies, such as batteries or converted A.-C. power, changes in the magnitude of the voltage supplied therefrom are relatively slow and usually can be compensated by means of a control such as the volume control on a radio receiver. Should the magnitude of the power supply voltage vary frequently from one minute to another, however, manual control becomes inconvenient and a more serious problem is presented. A specific example of frequent variation of magnitude of the D.-C. power supply occurs when the D.-C. power supply consists of solar cells, which derive their energy from the rays of the sum. The magnitude of the output voltage of the solar cells varies with the intensity of the sunlight. Thus, when a cloud or some other object prevents the rays of the sun from impinging upon the cells, the magnitude of the D.-C. voltage output can decrease substantially and the output of the electronic equipment supplied thereby will also decrease appreciably.

The change in overall gain, due to variations in the magnitude of the power supply, is true both of equipment using vacuum tubes and equipment using transistors.

It is to be noted that an automatic gain control means employing a conventional feedback arrangement will be relatively ineffective in compensating for changes in the magnitude of the D.-C. power, since they are not designed for that reason, but rather are designed to compensate for variations in the strength of the received signal.

To maintain a substantially constant overall gain over comparatively large fluctuations in the magnitude of the D.-C. power supply, the present invention provides an amplifier in which the gain varies inversely as the magnitude of the D.-C. power supply voltage. In order to better understand the invention, a brief discussion of transistors will be set forth. It is a characteristic of PNP and NPN type transistors that the gain thereof is a peak when the difference of potential between the base electrode and the emitter electrode is of a certain magnitude. If this potential difference is either decreased or increased below or above this certain magnitude, the gain will decrease. In prior art receivers this potential difference, which is also referred to herein as a biasing potential, has been such as to obtain near-maximum gain from the stage in which the transistor is being employed. With such an arrangement, however, the gain thereof will decrease should the D.-C. supply voltage decrease.

An object of the invention is to provide means for maintaining substantially constant gain in electronic equipment in which amplifiers employing transistors are used, even though substantial variations in the magnitude of the D.-C. voltage supply may occur.

A further object of the invention is to provide an amplifier stage employing a transistor in which the gain varies inversely as the potential difference between the base electrode and the emitter electrode.

Another aim of the invention is the improvement of amplifiers employing transistors, generally.

In accordance with the invention, circuit means comprising a D.-C. power supply are provided to impress across the base electrode and the emitter electrode a transistor a biasing potential of such a magnitude and polarity that said transistor will operate on that portion of its characteristic curve where the gain thereof varies inversely as the magnitude of said biasing potential. Said circuit means is constructed and arranged to be responsive to variations in the magnitude of the voltage from the D.-C. power supply to cause the magnitude of said biasing potential to vary accordingly.

In accordance with a feature of the invention, the said circuit means can comprise a voltage divider which functions to supply across said base electrode and said emitter electrode a proportionate amount of the voltage from said D.-C. power supply. Further, the transistor employed with the invention may be either a PNP type or an NPN type.

In accordance with another feature of the invention, transistors of the grounded emitter type, the grounded base type, and the grounded collector type, may be employed therein.

These and other objects and features of the invention will be more fully understood from the following detailed description thereof when read in conjunction with the drawings, in which.

Figures 1, 2:
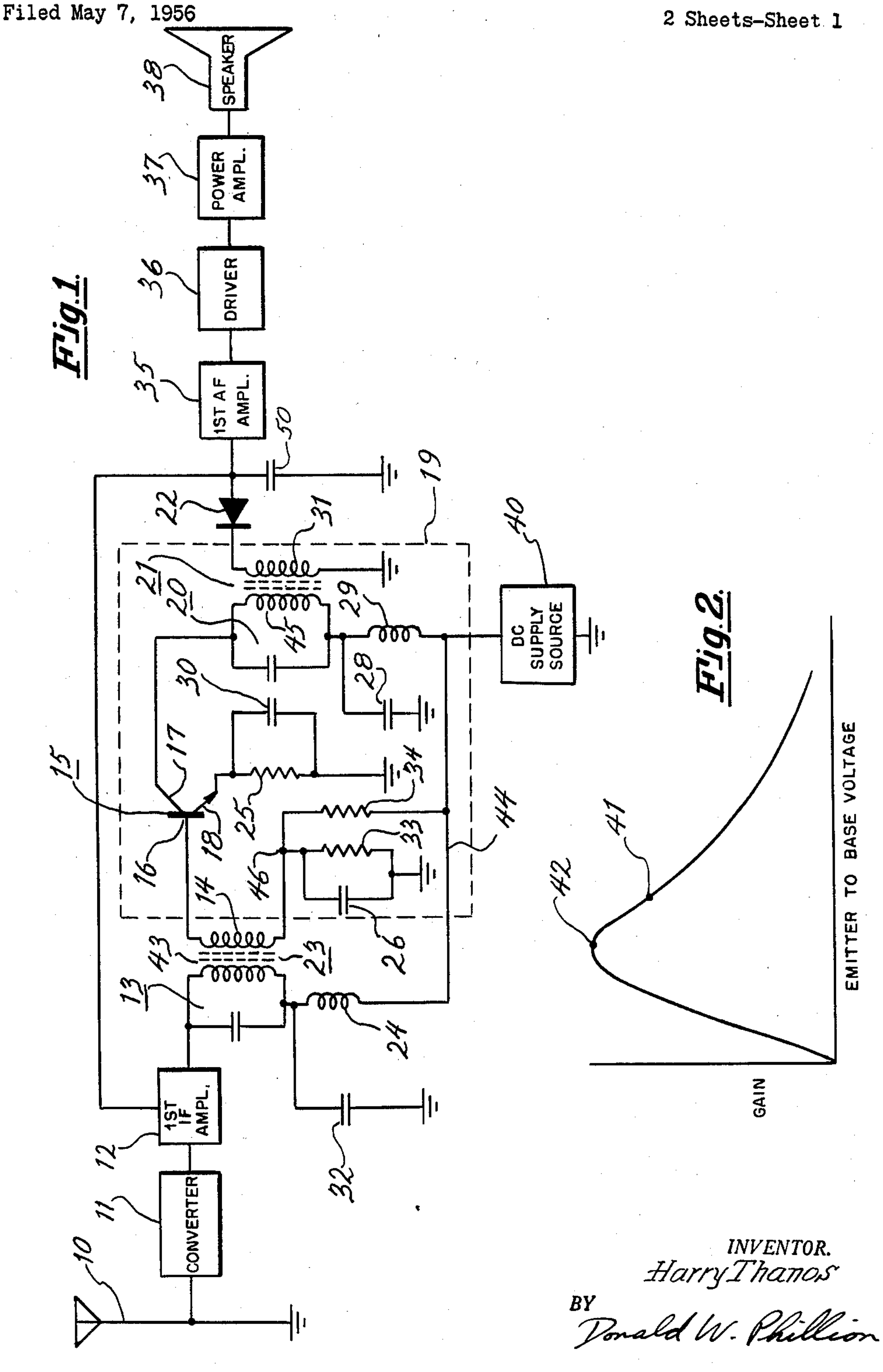
Fig. 1 is a combination schematic sketch and block diagram of the invention.
Fig. 2 is a curve of gain versus base to emitter potential of the transistor of Fig. 1.

As indicated hereinbefore, the invention can be employed with many different circuits. However, for purposes of illustrating how it can be applied in a specific circuit, the invention is shown in Fig. 1 as part of a superheterodyne-type radio receiver. The block diagram portion of the receiver is old, and the portion of the circuit within the broken line square 19 includes the invention.

The radio signal is intercepted by the antenna 10 and supplied to the converter 11, which functions in a well-known manner. The output signal of the converter 11 is supplied to the first intermediate frequency (IF) amplifier, which includes the block 12, the tuned circuit 13 (tuned to the intermediate frequency), the radio frequency choke 24, and the radio frequency by-pass capacitor 32. The output signal of the first IF amplifier stage is supplied to the second IF stage contained within block 19 by means of a powdered iron core transformer 23 comprising the winding 43 of tuned circuit 13 and the winding 14. The D.-C. voltage is supplied from D.-C. supply source 40 to the first IF amplifier stage through the lead 44. The circuitry within the dotted block 19, which represents the second IF stage, contains the structure of the present invention and will be described in more detail later. The output signal of the second IF stage 19 is supplied to the detector 22 through the powdered iron core transformer 21 which comprises the winding 45 of the tuned circuit 20 and the winding 31.

The output signal of the detector 22 is supplied to the speaker 38 through the audio frequency amplifier 35, the driver 36, and the power amplifier 37, which function in a well-known manner. Capacitor 50 is an RF by-pass capacitor.

Returning again to the structure within the dotted rectangle 19, the output of the first IF amplifier stage 12 is inductively coupled to the base 16 of the transistor 15 through the powdered iron core transformer 23. The transistor 15 also comprises a collector electrode 17 and an emitter electrode 18. The emitter electrode 18 is self-biased by means of resistor 25, which is shunted by radio frequency by-pass capacitor 30. Tuned circuit 20, which is tuned to the intermediate frequency, is energized by the signal appearing at the collector electrade 17. The D.-C. voltage is supplied to the collector electrode 17 through the radio frequency choke 29 and the tuned circuit 20. Capacitor 28 is a radio frequency by-pass capacitor.

The magnitude of the biasing potential for the base 16 of the transistor 15 is determined by the voltage divider circuit comprising resistor 34 and resistor 33, which connect the D.-C. supply source 40 to ground potential. In the prior art, the biasing potential has been of a magnitude as to produce a near-maximum gain for the transistor 15. Such a near-maximum gain occurs at the point 42 of the curve of Fig. 2, which illustrates the relationship between the gain of the transistor and the base to emitter potential. It will be observed that if the D.-C. supply voltage should decrease, the gain of the transistor will decrease since the point 42 will be moved to the left and thus down the slope of the curve. As mentioned hereinbefore, conventional automatic gain control systems will not compensate effectively for this type of loss of gain. However, by properly selecting the values of the resistors 34 and 33, so that the potential difference between the base electrode 16 and the emitter electrode 18 is sufficient to cause the transistor 15 to be operating at the point 41 of the curve of Fig. 2, substantial compensation for the above-mentioned type loss of gain will be effected. This occurs as follows: It can be seen from the curve of Fig. 2 that if the magnitude of the D.-C. supply voltage decreases, the point 41 (representing the biasing potential) will be moved to the left on the curve, and the gain of the transistor will increase. This increase in gain will compensate for loss in gain of other stages due to the decrease in the D.-C. supply voltage. Conversely, if the D.-C. supply voltage should increase, the gain will decrease, thus compensating for the increase of gain produced in the other stages of the receiver. Thus, the overall gain of the receiver tends to remain constant, although appreciable variations may occur in the magnitude of the D.-C. supply source 40.

The characteristic curve of Fig. 2 is applicable to both PNP and NPN type transistors, so that either type may be employed in the circuit of Fig. 1. However, in the case where a PNP type transistor is employed, the voltage source 40 will supply a negative voltage. Other differences, such as the values of circuit constants, will exist in the two cases. However, such differences are matters of design and will not be discussed in detail herein.

Figure 3:
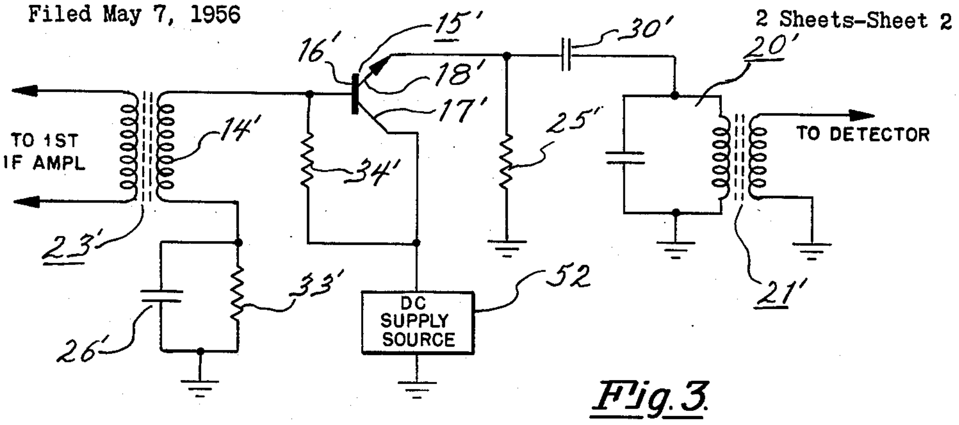
Fig. 3 is an alternative form of the invention.
Figure 4:
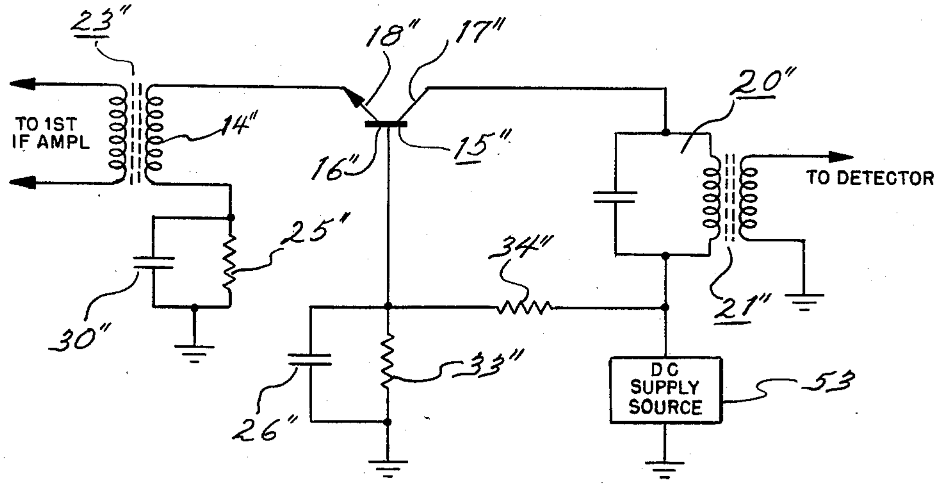
Fig. 4 is another alternative form of the invention.

In Fig. 3 there is shown another form of the invention employing a grounded collector electrode transistor rather than a grounded emitter transistor, as shown in Fig. 1. Elements of the circuit of Fig. 3, which have corresponding elements in Fig. 1, are given the same reference characters (primed). Specifically, these corresponding elements are transformer 23′, secondary winding 14′ of the transformer 23′, capacitor 26′, resistor 33′, resistor 34′, resistor 25′, capacitor 30′, tuned circuit 20′, transformer 21′, and the transistor 15′, which is comprised of base electrode 16′, emitter electrode 18′, and collector electrode 17′.

It is to be noted that the tuned circuit 20′ is energized by the signal appearing on the emitter electrode 18′ rather than on the collector electrode 17′, as is the case in the circuit of Fig. 1.

The resistor 34′, which is connected directly to the base electrode 16′, and the resistor 33′, form a D.-C. voltage divider for the D.-C. voltage from the supply source 52, and provides a difference of potential across the base electrode 16′ and the emitter electrode 18′ of a magnitude such as to cause the transistor to be operating at a point such as point 41 of the curve of Fig. 2. It is to be noted that although the curves of gain versus emitter to base voltage of the circuits of Figs. 1 and 3 are not exactly the same, they are similar enough to be represented by the one curve of Fig. 2.

Figure 5:
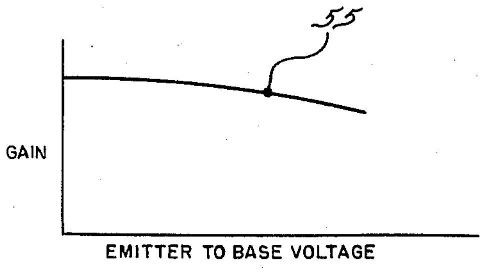
Fig. 5 is a curve of gain versus base to emitter potential of the transistor of Fig. 4.

In Fig. 3 there is shown a third form of the invention, employing a grounded base transistor. As in the case of Fig. 2, elements of the circuit of Fig. 3, having corresponding elements in the circuit of Fig. 1, will be given the same reference character (double primed). In this embodiment the signal from the first IF amplifier is supplied to the emitter electrode 18″ of the transistor 15″, which also comprises the base electrode 16″ and the collector electrode 17″. The tuned circuit 20″ is energized by the signal appearing at the collector electrode 17″. The voltage divider comprising the resistors 33″ and 34″ function to supply a sufficiently large proportion of the voltage from source 53 across the base 16″ and emitter 18″ electrodes so that the transistor 15″ will operate at a point on its characteristic curve where the gain varies inversely as the magnitude of the base to emitter electrode potential. Such a point is indicated by the reference character 55 of the curve of Fig. 5, which shows the relationship of gain versus the potential difference between the base and emitter electrodes. This curve is somewhat different in shape from the corresponding curves relating to the circuits of Figs. 1 and 2.

It is to be noted that the above forms of the invention herein shown and described are but preferred embodiments of the same, and that various changes may be made in circuit arrangement without departing from the spirit or scope of the invention.

I claim:

1. In combination; a transistor having a base electrode, an emitter electrode and a collector electrode; means for supplying direct current operating potentials to said transistor for operating said transistor at a point on its static characteristic curve where its gain varies inversely with the emitter to base potential, said means comprising: a source of direct current potential connected across said collector and said emitter electrodes; a voltage divider network connected across said potential source; and a connection between said base electrode and a point on said voltage divider network for establishing a potential difference between said emitter electrode and said base electrode whereby changes in the voltage of said direct current potential source give rise to changes in the same direction in said emitter to base potential difference.

2. In an amplifier including a plurality of amplification stages; a source of direct current potential common to said amplification stages for supplying operating voltages thereto; at least one of said stages including a transistor having a base electrode, an emitter electrode and a collector electrode; said transistor being operated at a point on its static characteristic curve where its gain varies inversely with the emitter to base potential; means for maintaining the gain of said amplifier substantially constant in the presence of fluctuations in the voltage of said direct current potential source comprising: biasing means for said transistor including voltage dividing means connected across said source of potential, for supplying a voltage across said base and emitter electrodes which is a portion of the voltage across said collector and emitter electrodes, whereby the derived bias potential between said emitter electrode and said base electrode varies in magnitude in the same direction as said voltage fluctuations.

3. In an amplifier including a plurality of amplification stages; a source of direct current potential common to said amplification stages for supplying operating voltages thereto; at least one of said stages including a transistor having a base, an emitter and a collector electrode; said transistor being operated at a point on its static characteristic curve where its gain varies inversely with the emitter to base potential; means for maintaining the gain of said amplifier substantially constant in the presence of variations in the voltage of said direct current potential source comprising: biasing means for said transistor including a self biasing resistor connected to said emitter and voltage dividing means connected across said common source of potential for supplying a voltage across said base and the series combination of said emitter and said biasing resistor which is a portion of the voltage across said collector and the series combination of said emitter and said biasing resistor, said last-mentioned voltage being sufficient to cause collector saturation in said transistor, whereby variations in said common source of direct current potential give rise to substantial changes, in the same direction, in the magnitude of the derived bias potential between said emitter electrode and said base electrode.

References Cited in the file of this patent

UNITED STATES PATENTS

| | | |
|---|---|---|
| 2,752,446 | Bopp | June 19, 1956 |
| 2,782,267 | Beck | Feb. 19, 1957 |
| 2,809,240 | Freedman | Oct. 8, 1957 |

OTHER REFERENCES

Shea: "Principles of Transistor Circuits," Sept. 15, 1953, pages 81 and 179.